(12) United States Patent
Zhu et al.

(10) Patent No.: US 11,545,714 B2
(45) Date of Patent: Jan. 3, 2023

(54) BATTERY PACK AND GARDENING TOOL

(71) Applicant: Skybest Electric Appliance (Suzhou) Co., Ltd., Suzhou (CN)

(72) Inventors: Yanling Zhu, Suzhou (CN); Minjie Wu, Suzhou (CN); Juan Wei, Suzhou (CN)

(73) Assignee: SKYBEST ELECTRIC APPLIANCE (SUZHOU) CO., LTD., Suzhou (CN)

( * ) Notice: Subject to any disclaimer, the term of this patent is extended or adjusted under 35 U.S.C. 154(b) by 297 days.

(21) Appl. No.: 16/633,624

(22) PCT Filed: Jul. 24, 2018

(86) PCT No.: PCT/CN2018/096746
§ 371 (c)(1),
(2) Date: Jan. 24, 2020

(87) PCT Pub. No.: WO2019/019989
PCT Pub. Date: Jan. 31, 2019

(65) Prior Publication Data
US 2020/0235355 A1  Jul. 23, 2020

(30) Foreign Application Priority Data
Jul. 25, 2017 (CN) .......................... 201710608702.1

(51) Int. Cl.
*H01M 50/256* (2021.01)
*H01M 50/20* (2021.01)

(52) U.S. Cl.
CPC ......... *H01M 50/256* (2021.01); *H01M 50/20* (2021.01); *H01M 2220/10* (2013.01)

(58) Field of Classification Search
None
See application file for complete search history.

(56) References Cited

U.S. PATENT DOCUMENTS 6,929,882 B1    8/2005  Carter
2016/0336557 A1* 11/2016  Miller .................. A01D 34/416

FOREIGN PATENT DOCUMENTS

| CN | 203721795 U | 7/2014 |
| CN | 205752318 U | 11/2016 |
| CN | 107240661 A | 10/2017 |
| CN | 207282554 U | 4/2018 |

OTHER PUBLICATIONS

International Search Report for International Application No. PCT/CN2018/096746, dated Oct. 18, 2018.

* cited by examiner

*Primary Examiner* — Wyatt P McConnell
(74) *Attorney, Agent, or Firm* — JK Intellectual Property Law, PA

(57) ABSTRACT

A battery pack includes a main body, and a handle rotatably connected to the main body. The handle is integrally formed by a steel wire. A related garden tool includes a working head, a power driving device for driving the working head to work, and the battery pack.

7 Claims, 4 Drawing Sheets

BATTERY PACK AND GARDENING TOOL

CROSS-REFERENCE TO RELATED PATENT APPLICATIONS

This application is a national stage of International Application No. PCT/CN2018/096746, filed on Jul. 24, 2018 which claims priority to CN Patent Application No. 201710608702.1, filed on Jul. 25, 2017. All of the aforementioned applications are hereby incorporated by reference in their entireties.

TECHNICAL FIELD

The present disclosure relates to a battery pack and a garden tool.

BACKGROUND OF THE DISCLOSURE

Existing battery packs are generally plugged and unplugged by hand in an unlocked state, mainly because: 1) the existing largest 54V dual-parallel battery pack weighs only 1.8 kg (the single-parallel battery pack is less than 1 kg), and ordinary people can easily plug, unplug and carry batteries; and 2) the existing largest 54V dual-parallel battery pack is 88 mm high, and can be easily held by one hand.

However, with the needs of industrial development, there are increasingly larger and heavier battery packs. For example, a 72V dual-parallel battery pack designed now weighs about 2.5 kg, which is more than one third heavier than the 54V dual-parallel battery pack. The height of the 72V dual-parallel battery pack is increased to 110 mm, so it is very laborious to hold the battery pack just by hand. This problem is more prominent for some people having smaller hands, and especially after a charger is plugged and charged, the weight of the battery pack itself and the plugging and unplugging force bring a very bad user experience. How to obtain a better user experience when a user uses a garden tool with such heavy battery pack is an urgent problem in the prior art.

At present, in the field of batteries, there have been ways to solve similar problems, such as Chinese Utility Model Patent No. CN203721795U, where a handle is disposed on a cover such that a user can carry a battery more easily, but the connection structure for the handle and the battery is complex, the handle is difficult to form, and the handle made of plastic is low in strength and large in size. In the technical fields of garden tools and electric tools, there is no technical solution to solve the above technical problems.

SUMMARY

The present disclosure aims is to provide a battery pack that can be easily plugged, unplugged and carried in view of the foregoing defects in the prior art, where the handle of the battery pack has high strength and small size.

In order to achieve the above object of the present disclosure, the present disclosure adopts the following technical solution: A battery pack includes a main body and a handle rotatably connected to the main body, the handle being integrally formed by a steel wire.

In addition, the present disclosure also includes the following subsidiary technical solutions:

The main body includes a shell on the periphery of the main body, mounting holes are provided on two sides of the shell, connecting portions are provided on two sides of the handle, and the connecting portions are rotatably mounted in the mounting holes.

The main body includes batteries in an inner cavity of the main body and an end cover at one end of the main body, the shell is provided with an opening for picking and placing the batteries, and the end cover is disposed on the opening for closing the opening.

Recessed portions communicating with the mounting holes are provided on two sides of the end cover, and the connecting portions at least partially stretch into the recessed portions.

The recessed portions are holes or slots.

A groove for accommodating the handle is provided on the periphery of an end of the shell.

At least one buckle capable of fixing the handle is disposed in the groove.

The handle has a use state and a non-use state. In the use state, the handle is rotated to the upper part of the main body; and in the non-use state, the handle is placed in the groove and fixed to the buckle.

In the non-use state, the size of the external contour of the handle is smaller than the size of the periphery of the battery pack.

The main body further includes a rubber coating disposed outside the shell, and the rubber coating at least partially covers the shell.

In addition, the present disclosure also provides a garden tool, including a working head, a power driving device for driving the working head to work, and the battery pack for providing power for the power driving device.

The present disclosure has the following advantages:

The handle of the battery pack of the present disclosure is integrally formed by a steel wire, so the handle is easy to manufacture, the handle is conveniently connected to the battery pack, and the handle has high strength and small size. The handle is connected to the shell, so that when the battery pack is lifted, the shell having high strength bears the force, and the battery pack is safer, more reliable and simple in structure, and the handle is convenient to mount. The handle of the battery pack partially stretches into the end cover, and when the battery pack is accidentally dropped or impacted or vibrated, the end cover is unlikely to separate from the shell, which improves the connecting strength and safety. In addition, the battery pack of the present disclosure is provided with a groove for accommodating the handle, so that the handle does not occupy extra space when not in use, and is more attractive. The battery pack is also provided with a rubber coating, which can play a buffering role under impact or the like to reduce the damage to the battery pack. The battery pack is provided with buckles on the groove, so that the handle can be conveniently taken out.

DETAILED DESCRIPTION

The technical solution of the present disclosure will be further described in a non-limiting manner with reference to the preferred embodiments and the accompanying drawings.

A preferred embodiment of the present disclosure provides a garden tool, including a working head (not shown), a power driving device (not shown) for driving the working head to work, and a battery pack for providing power source for the power driving device.

Figure 1:
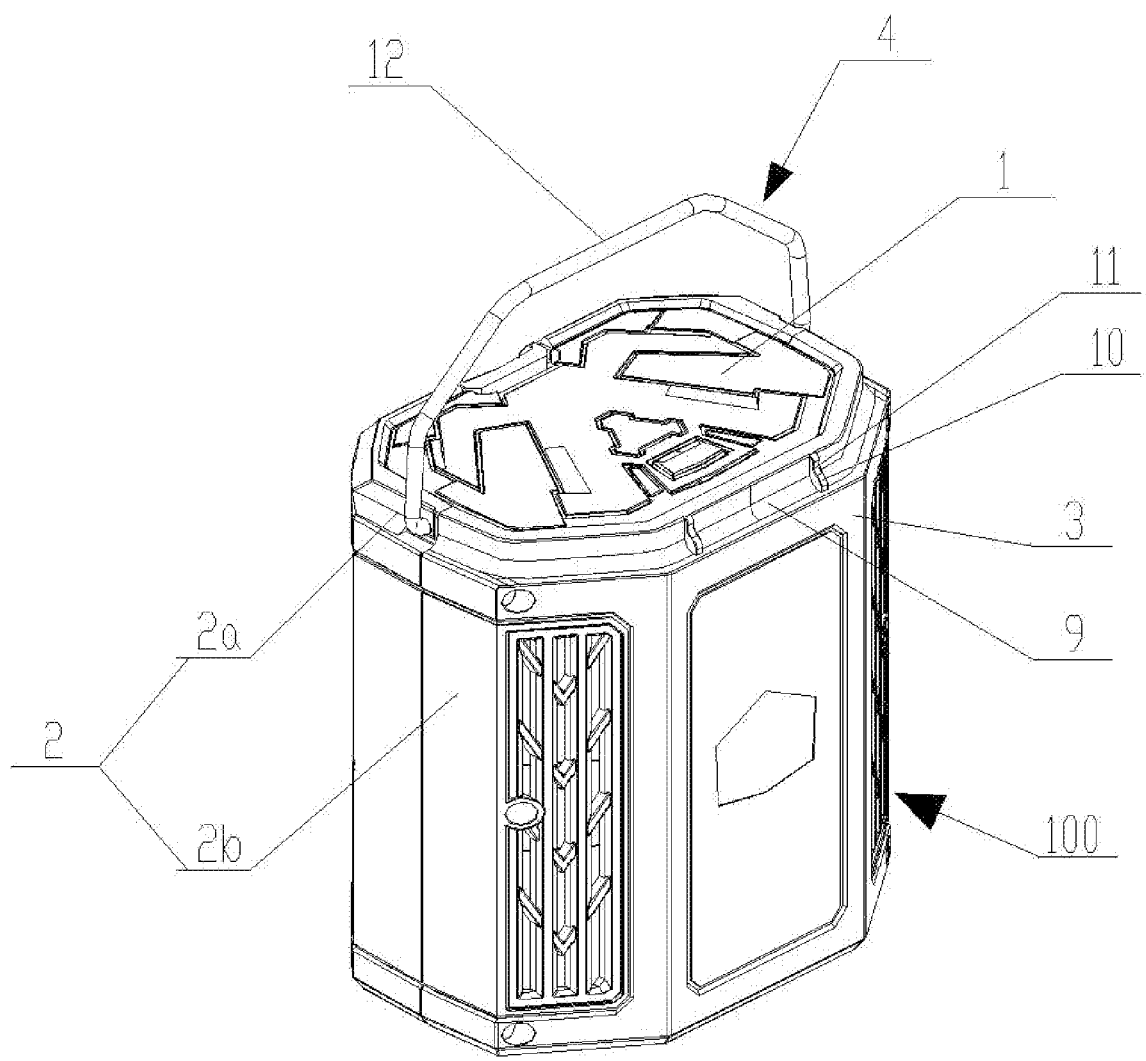
FIG. 1 is a schematic diagram of a handle of a battery pack according to the present disclosure in a use state.
Figure 2:
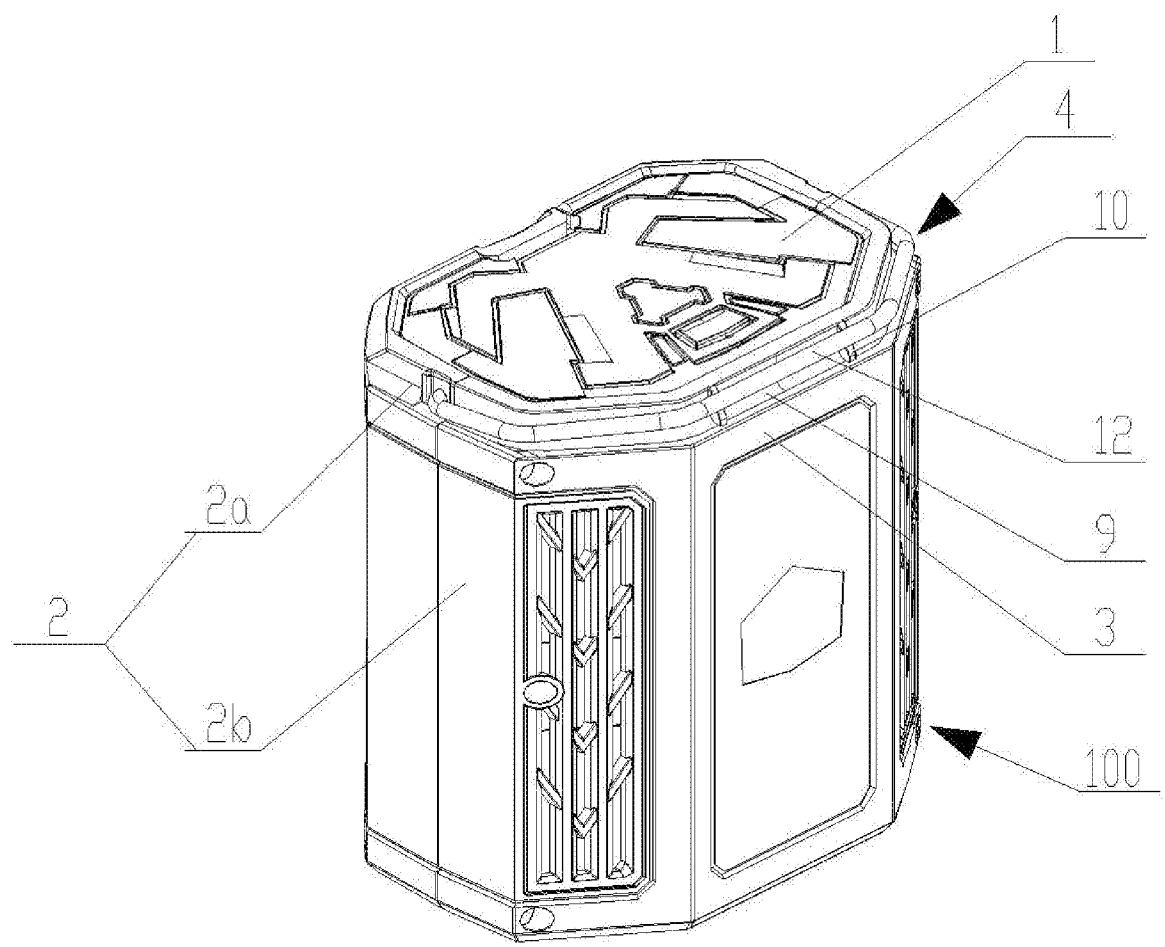
FIG. 2 is a schematic diagram of the handle of the battery pack according to the present disclosure in a non-use state.
Figure 3:
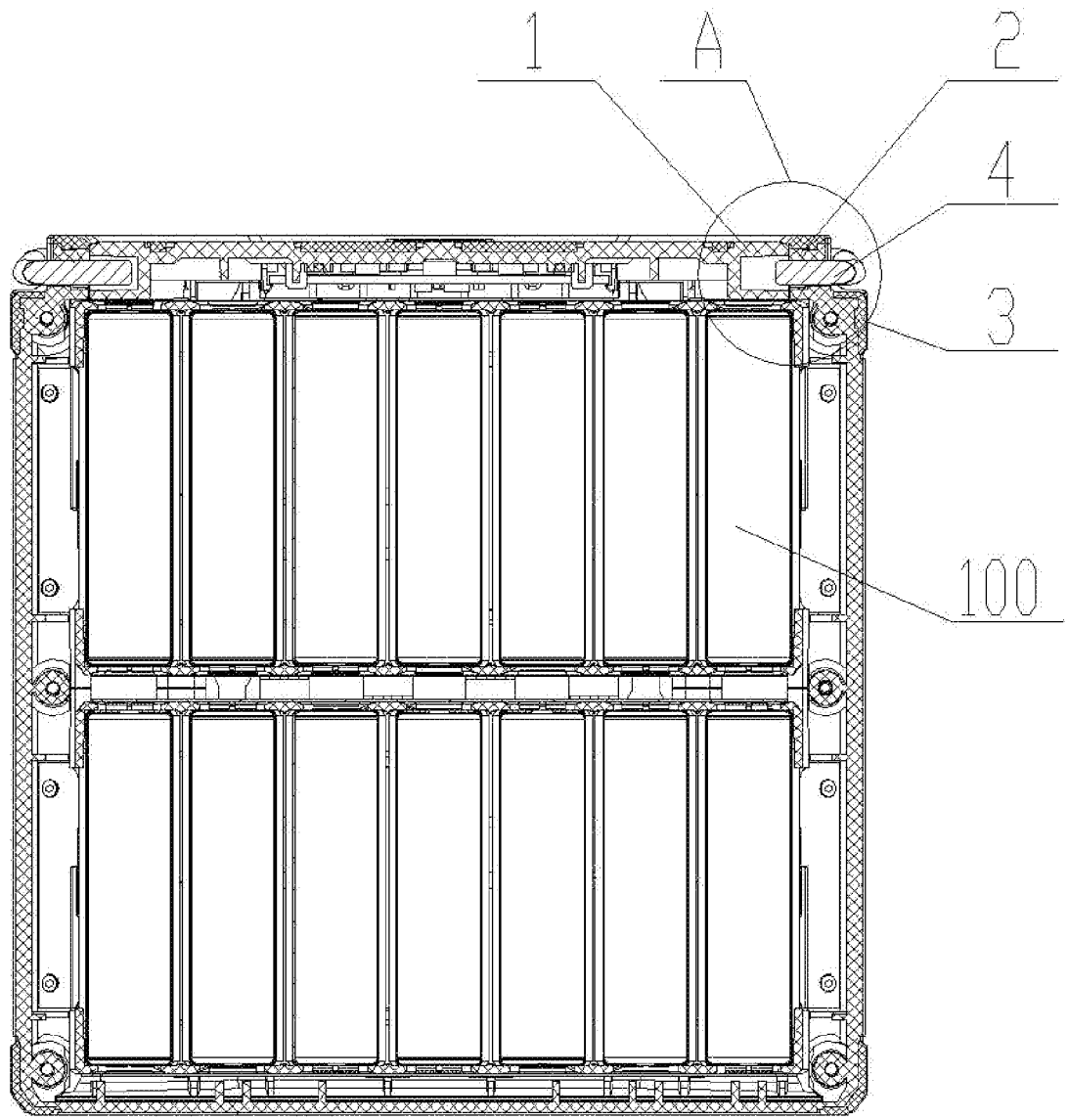
FIG. 3 is a sectional view of the battery pack according to the present disclosure.
Figure 4:
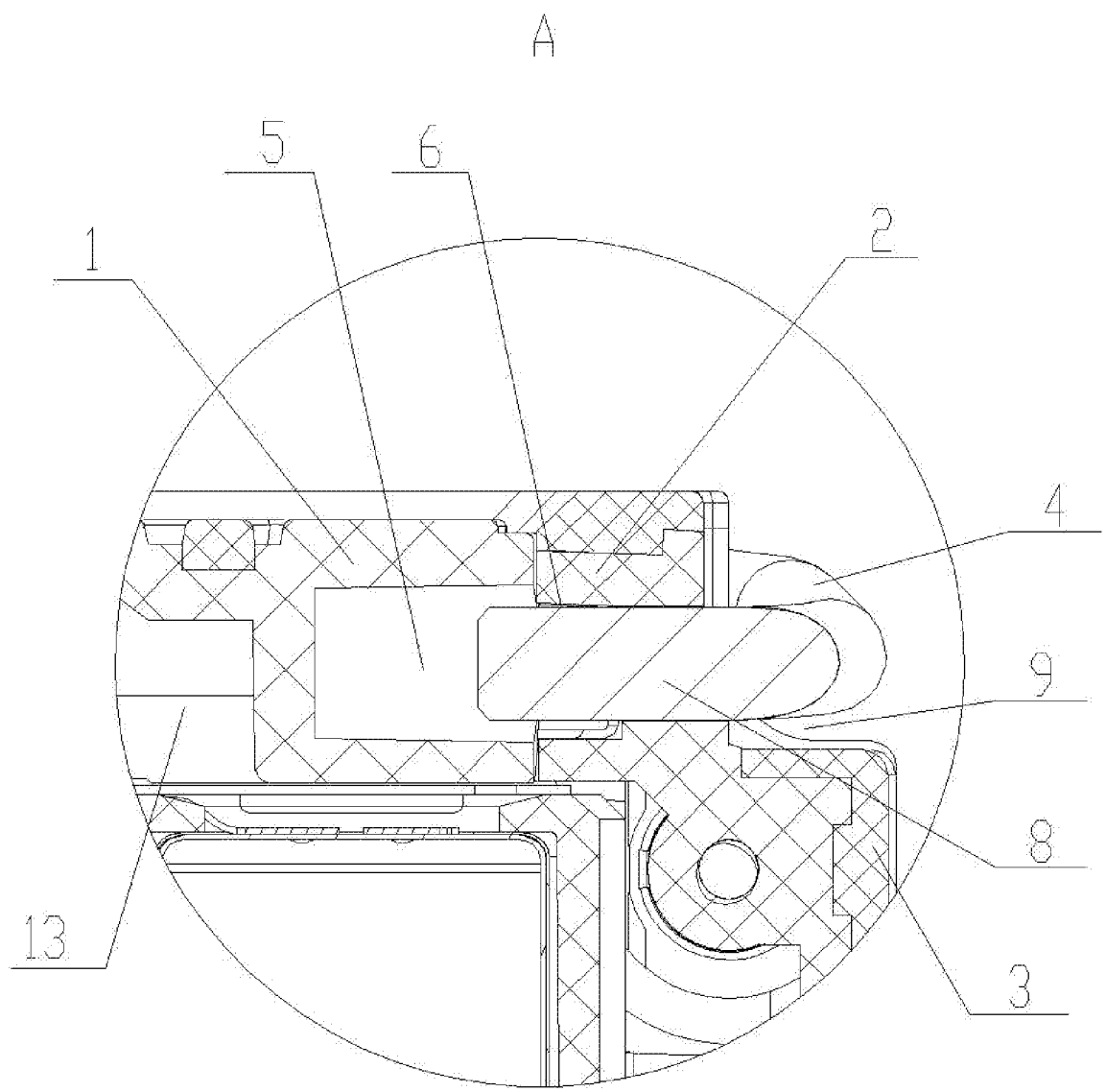
FIG. 4 is a partial enlarged view of a portion A in FIG. 3.

As shown in FIG. 1 to FIG. 4, a battery pack corresponding to the preferred embodiment of the present disclosure includes a main body 100 and a handle 4 rotatably connected to the main body 100, the handle 4 being integrally formed by a steel wire.

The main body 100 includes an end cover 1, a shell 2, a rubber coating 3, and batteries in an inner cavity of the main body 100. The shell 2 is used for accommodating the batteries, and may be disposed integrally or assembled by an upper cover 2a and a lower cover 2b. The upper part of the shell 2 is provided with an opening 13 for picking and placing the batteries, and the end cover 1 is disposed on the opening 13 of the shell 2 for closing the opening 13. The rubber coating 3 is disposed outside the shell 2. The rubber coating 3 is preferably made of TPE rubber with good vibration absorption performance, and at least partially covers the shell 2. In this embodiment, the rubber coating 3 covers the periphery of the upper and lower ends of the shell 2. Recessed portions 5 are provided on two sides of the end cover 1. The recessed portions 5 may be holes or slots. In this embodiment, the recessed portions 5 are holes. Mounting holes 6 are provided on two sides of the shell 2 corresponding to the recessed portions 5. The handle 4 has a symmetrical structure and is roughly C-shaped, connecting portions 8 protruding inward are provided on two sides, a holding portion 12 for connecting the two connecting portions 8 is provided in the middle, and the battery pack is held by holding the holding portion 12 by hand. The connecting portions 8 pass through the mounting holes 6 and at least partially stretch into the recessed portions 5 to connect the end cover 1 and the shell 2 serially together, so that the end cover 1 is unlikely to fly out when shaken or dropped, and the damage to the battery pack is reduced under the buffering effect of the rubber coating 3; besides, the structure enables the handle 4 to rotate about the axis of the connecting portions 8.

In addition, a groove 9 for accommodating the handle 4 is provided on the periphery of the shell 2. The groove 9 is at the top of the shell 2 and communicates with the mounting holes 6 and the recessed portions 5. One or more buckles 10 are also disposed in the groove 9, and the number is two in this embodiment. The buckles 10 may be made of plastic with high elasticity, and are provided with clamping grooves 11 slightly smaller than the diameter of the handle 4 for clamping the handle 4. With the buckles 10, the handle 4 does not closely fit with the groove 9 of the shell 2, but certain gap is reserved, so that the handle 4 can be taken out more conveniently by finger. The buckles 10 may be integrally formed with the shell 2.

The handle 4 is integrally formed by a steel wire having high strength. Compared with plastic, the steel wire has the following advantages: first, the steel wire has high strength, so that the battery pack is unlikely to be damaged when dropped accidentally; second, the steel wire having small size is easy to store; and third, the steel wire having large elastic deformation is convenient to assemble. When the handle 4 is installed, the connecting portion 8 on one side of the handle 4 is inserted into a recessed portion 5, then the handle 4 is spread, the connecting portion 8 on the other side is aligned with the other recessed portion 5, the handle 4 is slowly released, and the handle 4 is inserted into the other recessed portion 5 while returning to the original shape, thus completing the installation of the handle 4. When the handle 4 is detached, the handle 4 can be taken out only by spreading outward.

The handle 4 has a use state and a non-use state. In the use state, the handle 4 is rotated about the axis of its connecting portions 8 to the upper part of the main body 100 (see FIG. 1), and the battery pack can be plugged, unplugged and carried by holding the holding portion 12 of the handle 4 with a hand. In the non-use state, the handle 4 is rotated into the groove 9 and snapped into the corresponding buckles 10 (see FIG. 2), and the size of the external contour of the handle 100 is smaller than the size of the periphery of the battery pack, so that no extra space is wasted in the presence of the handle 4, and the overall package is small and attractive.

The battery pack is provided with a handle 4, so that the heavy battery pack can be plugged, unplugged and carried more easily, and even if the battery pack is plugged into a charger, the battery pack can be easily taken away in an unlocked state; the handle 4 is mounted on the shell 2 and partially stretches into the end cover to improve the structural strength of the battery pack greatly, so that when the battery pack is lifted, the shell having high strength bears the force and the ability of bearing the force is better; in addition, if the battery pack is accidentally dropped or vibrated and impacted, the handle can play a supporting and connecting role, so that the end cover 1 and the shell 2 of the battery pack are unlikely to ricochet or separate; the rubber coating 3 made of a TPE material with good vibration reduction effect can play a buffering role, so that the shell 2 is not easily broken and the damage to the battery pack is reduced; the handle 4 can be placed in the groove 9 when not in use, which is attractive and does not take up the space; the handle 4 can be fixed by the buckles 10, and a gap can be reserved for taking out the handle 4 conveniently by finger; and the handle 4 made of a steel wire not only has large elastic deformation, but also is convenient to disassemble and assemble and low in cost.

The preferred embodiment of the garden tool using the battery pack of the present disclosure is a lawn mower, but is not limited to the lawn mower, and may also be other garden tools such as a blower-sucker, a chain saw, a pruning machine, a lawnmower, and a single blower. When a user works with the garden tool having the heavy battery pack, because the integrated handle is mounted on the battery pack, the heavy battery pack can be conveniently carried, plugged and unplugged, and the structure strengthens the connecting strength of the end cover and the shell. In addition, the handle can be placed in the groove when not used, which is attractive and does not take up the space, and the overall packaging size is small.

It should be pointed out that the foregoing embodiments are merely to illustrate the technical concept and characteristics of the present disclosure, and aim to allow a person who is familiar with this technology to understand the content of the present disclosure and implement the same, and the protection scope of the present disclosure is not limited thereto. All equivalent variations or modifications made according to the essence of the present disclosure shall fall within the protection scope of the present disclosure.

The invention claimed is:

1. A battery pack, comprising:
   a main body; and
   a handle rotatably connected to the main body, the handle being integrally formed by a steel wire;
   wherein the main body includes a shell configured on a periphery of the main body, mounting holes being defined on two sides of the shell, the handle including connecting portions on two sides of the handle, the connecting portions being rotatably mounted in the mounting holes;

wherein the main body includes batteries in an inner cavity of the main body and an end cover at one end of the main body, the shell defining an opening for picking and placing the batteries, the end cover being located on the opening for closing the opening; and wherein recessed portions communicating with the mounting holes are defined on two sides of the end cover, the connecting portions at least partially extending into the recessed portions.

2. The battery pack according to claim 1, the recessed portions being configured as one of holes or slots.

3. The battery pack according to claim 1, a groove for accommodating the handle being defined on a periphery of an end of the shell, at least one buckle capable of fixing the handle being disposed in the groove.

4. The battery pack according to claim 3, the handle having a use state and a non-use state;
   in the use state, the handle is rotated to an upper part of the main body; and
   in the non-use state, the handle is placed in the groove and fixed to the buckle.

5. The battery pack according to claim 4, in the non-use state, a size of an external contour of the handle is smaller than a size of a periphery of the main body.

6. The battery pack according to claim 1, the main body further including a rubber coating disposed on an outside of the shell, the rubber coating at least partially covering the shell.

7. A garden tool, comprising:
   a working head;
   a power driving device for driving the working head to work; and
   the battery pack according to claim 1 for providing power for the power driving device.

* * * * *